(No Model.)
F. VISSCHER.
TRANSPLANTING INSTRUMENT.
No. 289,185. Patented Nov. 27, 1883.
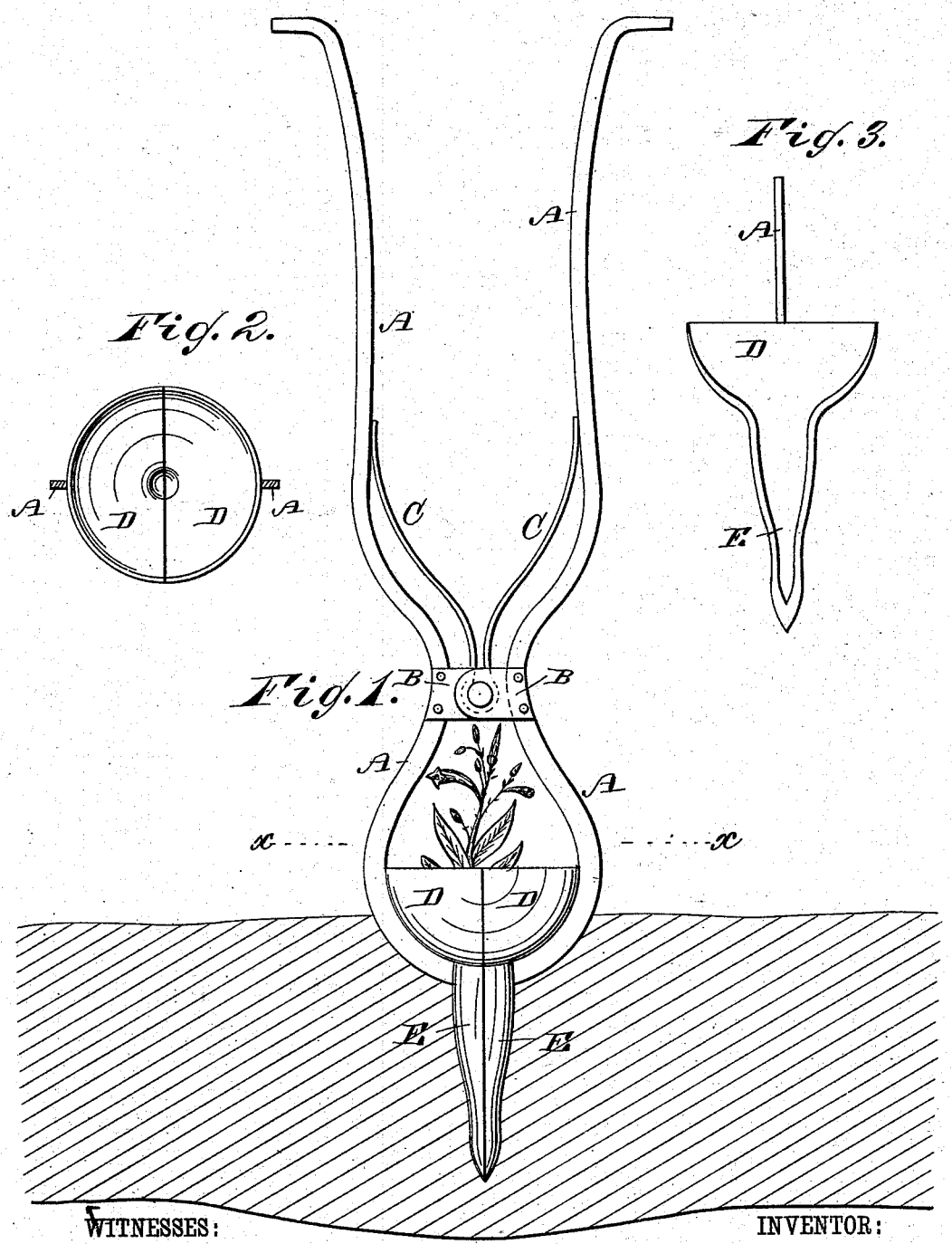

UNITED STATES PATENT OFFICE.

FREDERICK VISSCHER, OF MOUNT STERLING, KENTUCKY.

TRANSPLANTING-INSTRUMENT.

SPECIFICATION forming part of Letters Patent No. 289,185, dated November 27, 1883.

Application filed June 9, 1883. (No model.)

*To all whom it may concern:*

Be it known that I, FREDERICK VISSCHER, of Mount Sterling, county of Montgomery, Kentucky, have invented a new and Improved Transplanting-Instrument, of which the following is a full, clear, and exact description.

The object of my invention is to provide new and improved implements for planting plants and flowers and placing them in the holes in the ground.

The invention consists in a transplanter formed of two half-bowls or half cone-sections secured on the lower ends of two arms or levers pivoted to each other, and having their upper ends pressed apart by a spring, which bowl-sections are provided on the bottoms with downwardly-projecting tapering recessed root-receptacles, which form a prong for forcing the implement into the ground.

Reference is to be had to the accompanying drawings, forming part of this specification, in which similar letters of reference indicate corresponding parts in all the figures.

Figure 1 is a longitudinal side elevation of my improved transplanting-instrument. Fig. 2 is a sectional plan view of the same on the line $x$ $x$, Fig. 1, and Fig. 3 is an inner face view of one of the bowl-sections.

Two curved levers or arms, A, are provided near their lower ends with jaws B, which are pivoted to each other, or the levers are pivoted directly to each other, and on the pivot a spring, C, is held, the ends of which press against the upper ends of the arms or levers, and thereby press the lower ends of the levers toward each other. The upper ends of the levers are provided with suitable handles. To the lower end of each lever A a half-conical or quarter-spherical bowl or vessel, D, is fastened, from each of which bowl-sections a downwardly-tapering root-receptacle, E, projects, which is recessed or hollowed out on its inner side. When the two root-receptacles are pressed against each other, they form a tapering pintle or prong projecting from the bottom of the bowl. The plant, flower, &c., which is to be planted is placed in the bowl, the root being pressed down into the cavity formed by the root-receptacle E. Then the prong formed by the root-receptacles and the bowl are pressed into the earth until the upper edge of the bowl is about flush with the surface of the earth. Then the upper or handle ends of the lever A are pressed toward each other, whereby the bowl-sections D will be separated and will release the plant, which remains in the ground, the bowl-sections D being withdrawn.

The plant can be carried about very easily in the above-described transplanter, and is not injured either by being carried about nor by being transplanted.

The bowl-sections are provided with rounded edges at their junction with the root-receptacle, so that the friction will be reduced as much as possible when the plant leaves the bowl.

Having thus described my invention, I claim as new and desire to secure by Letters Patent—

1. In a transplanting implement, the combination, with two levers or arms pivoted to each other, of half-bowls secured on the lower ends of the arms, and of downwardly-tapering recessed root-holding receptacles projecting from the bottom of each bowl-section, substantially as herein shown and described, and for the purpose set forth.

2. In a transplanting implement, the combination, with the two levers or arms, A, pivoted to each other, of the half-bowls D, secured to the lower ends of the same, the spring C, and the tapering recessed root-holding receptacles projecting from the bottom of the bowl-sections, substantially as herein shown and described, and for the purpose set forth.

FREDERICK VISSCHER.

Witnesses:
  JOHN O. MILLER,
  JNO. G. WINN.